United States Patent [19]

Outram et al.

[11] Patent Number: 4,910,692
[45] Date of Patent: Mar. 20, 1990

[54] ADAPTIVE DATA LOGGER

[76] Inventors: John D. Outram, Taylor's Lane, Bosham, Chichester W. Sussex, England, P018 8QQ; Richard G. Outram, Clarence Street, Darmouth Devon, England, TQ6 9NW

[21] Appl. No.: 785,770

[22] Filed: Oct. 9, 1985

[51] Int. Cl.[4] ..................... G06F 15/20; G01N 29/00; G01V 1/00

[52] U.S. Cl. ................................... 364/550; 364/420; 340/690; 73/579; 73/658

[58] Field of Search .................. 364/550, 420–422, 364/557; 340/683, 686, 690, 347 M, 347 AD; 73/649, 570, 579, 654, 658

[56] References Cited

U.S. PATENT DOCUMENTS

| | | | |
|---|---|---|---|
| 4,184,205 | 1/1980 | Morrow | 364/550 |
| 4,381,544 | 4/1983 | Stamm | 364/420 |
| 4,400,783 | 8/1983 | Locke, Jr. et al. | 364/550 |
| 4,484,290 | 11/1984 | Bagnall et al. | 364/483 |
| 4,541,063 | 9/1985 | Doljack | 364/550 |
| 4,553,233 | 11/1985 | Bouhelier et al. | 364/420 |
| 4,612,620 | 9/1986 | Davis et al. | 364/550 |
| 4,616,320 | 10/1986 | Kerr et al. | 364/420 |
| 4,683,542 | 7/1987 | Taniguti | 364/550 |
| 4,695,965 | 9/1987 | Fujita et al. | 364/550 |
| 4,718,025 | 1/1988 | Minor et al. | 364/550 |

FOREIGN PATENT DOCUMENTS 3211017  10/1982  Fed. Rep. of Germany .

Primary Examiner—Parshotam S. Lall
Assistant Examiner—Brian M. Mattson
Attorney, Agent, or Firm—Darby & Darby

[57] ABSTRACT

A data logger having a plurality of input ports has a library of predefined selectable input data conversion protocols. Inputs are individually controllable as to the type of sensor conversion. The data logging rate is varied during the recording period to ensure that all meaningful data values are recorded, while at the same time ensuring that the entire data storage capacity of the data logger will be substantially fully utilized at the completion of the recording period. Sensitivity is constantly adjusted to ensure that no meaningful data values are missed, whether the pertinent information concerns high frequency, low amplitude fluctuations (e.g., noise), or concerns longer-term trends, ignoring short-term variations.

7 Claims, 4 Drawing Sheets

ADAPTIVE DATA LOGGER

BACKGROUND OF THE INVENTION

1. Field of the Invention

This invention generally relates to data loggers. More specifically, the invention concerns data logging devices which adapt, control, or adjust the recording or logging parameters in response to changes in the data being logged. The invention is applied, in a preferred embodiment, to a multiple channel data logger having extremely high data resolution and accuracy.

2. Description of the Prior Art

A data logger may generally be described as a recording device for creating a time-sequence history of events. Such events might include, as illustrations only, variations in pollutant levels in lake water, sewage treatment plant outfall, or ambient air. Data loggers are used in the field of weather observation to obtain time records of wind speed and direction, relative humidity, barometric pressure, or rainfall, and in the field of geological surveying for detecting earth movement.

Probably the most common use of data loggers is temperature recording, with the aid of thermistors, thermocouples (such as Type J or Type K), or other temperature measuring devices. In temperature recording and the other abovementioned applications, it is usually desirable to obtain a long-term record. The particularly desired information being recorded, however, may occur over only a very short segment of the total long-term recording period. This is generally the case in failure detection applications, where the data values logged are roughly constant over substantially the entire term, until and unless some component or process being monitored fails, at which time a great range of value change or fluctuation may occur.

Furthermore, the data values during these "critical" periods may differ from the normally encountered values by one or more orders of magnitude. Of course, there are applications in which the logged data values are expected to vary over several orders of magnitude and at frequency intervals which may also greatly fluctuate.

These aforementioned substantial problems are handled in only the most basic of manners in the prior art data loggers. The first problem, i.e., the fact that there are scores of different types of sensors which may be used for logging data, each of these probes having a different scale or protocol for its provided sensed values (usually provided as a voltage), has been solved in the past by custom building each data logger to the specification and for the particular sensor or sensors desired by the customer.

The second serious problem lies in the inability of prior art data loggers to provide high degrees of data accuracy and resolution. Here, too, the solution has been to custom design into each separate data logger the particular range over which meaningful data values may be encountered. In this extremely expensive fashion, a user can obtain a device for a desired purpose, and the device may even provide somewhat satisfactory data accuracy and resolution, so long as the encountered data values do not exceed the design envelope.

In another prior art attempt to solve this second particular problem, a metering band having generally satisfactory accuracy and resolution characteristics is established about the first logged data value. The predetermined bandwidth may be five percent of the data value, plus or minus, for the purpose of illustration. So long as the encountered data values do not exceed the limits of the metering band, sufficiently accurate values are recorded. Once a data value traverses either of the band limits, however, the band is shifted in a predetermined fashion, for example, by establishing the limit-crossing value as the new band center.

A third and equally substantial problem briefly noted above is that data loggers are generally used to obtain long-term records, even though the relevant events of interest may occur very rapidly and over only brief intervals during the much longer time record. Prior art data loggers merely provide sufficient data storage media, e.g., continuous strip chart paper, magnetic storage medium, or the like, for data recording at preselected regular intervals throughout the entire period. In the common situation where much of the relevant data is generated in a relatively short period within the long-term logging period, the density of information at that critical time period precludes meaningful data capture, the frequency of data value recording being unvaryingly slow with respect to the frequency of new and meaningful data values.

Still another drawback of known data loggers is the unwieldy format of the time record. In the case where a continuous strip of paper or other "hard copy" medium is used, the entire strip must be visually examined in order to locate the useful or relevant portions. The search is complicated by the fact that a time record strip for a period covering a number of months may actually be hundreds of feet long. Even after the relevant portions of the record are located, little more than visual inspection is possible. Any additional analysis, e.g., statistical, to be performed first requires that the dat values be scanned, digitized, or otherwise input into calculating means. This may be cumbersome in many instances, and may be so onerous as to be impracticable.

BRIEF SUMMARY OF THE INVENTION

With the above-described problems, among others, in mind, it is a broad object of this invention to provide a new and remarkably improved data logger which is highly versatile in its possible uses and at the same time so powerful in its capabilities so as to outperform even dedicated, custom-configured data loggers.

An object of the invention is to provide a new data logger which can store data values over a long period of time without the need for large memory or storage capacity.

Another object is to provide an improved data logger which can record widely differing data values, over widely differing recording frequencies, without degradation of either the data value resolution or accuracy.

Yet another object of the invention is to provide a single data logging device which may meet any of a particular user's recording needs, without the necessity for custom configuring.

Another object is to provide an improved data logger achieving each of the aforementioned objects while at the same time being inexpensive to manufacture.

Another object is to provide a data logger which captures data values in a format which is both readily accessible, easily understood, and which may be easily interpreted, analyzed, or otherwise manipulated.

Still another object of the invention is to provide an improved data logger which can be exposed to generally severe environmental conditions for long periods of time, which does not take up significant space, and which does not require substantial power in order to operate during an extended recording period.

In accordance with aspects of the invention, an adaptive data logger is provided which meets these objectives. A low cost data logger having a plurality of input ports has a library of predefined selectable input data conversion protocols. Each input is individually controllable as to the type of sensor conversion, among other criteria. The logging rate is varied during the period to ensure that all meaningful data values are recorded, while at the same time ensuring that the entire data storage capacity of the data logger will be substantially fully utilized at the completion of the recording period. Logger sensitivity is constantly adjusted to ensure that no meaningful data values are missed, whether the pertinent information concerns high frequency, low amplitude fluctuations (e.g., noise), or concerns longer-term trends, ignoring short-term variations.

Means for rapidly examining and analyzing the full range of logged data, or any desired portion, are provided.

BRIEF DESCRIPTION OF THE DRAWINGS

These and other features, objects and advantages of the invention will be more clearly understood from the following detailed description, in conjunction with the accompanying drawings, in which.

DETAILED DESCRIPTION OF THE PREFERRED EMBODIMENTS

Figure 1:
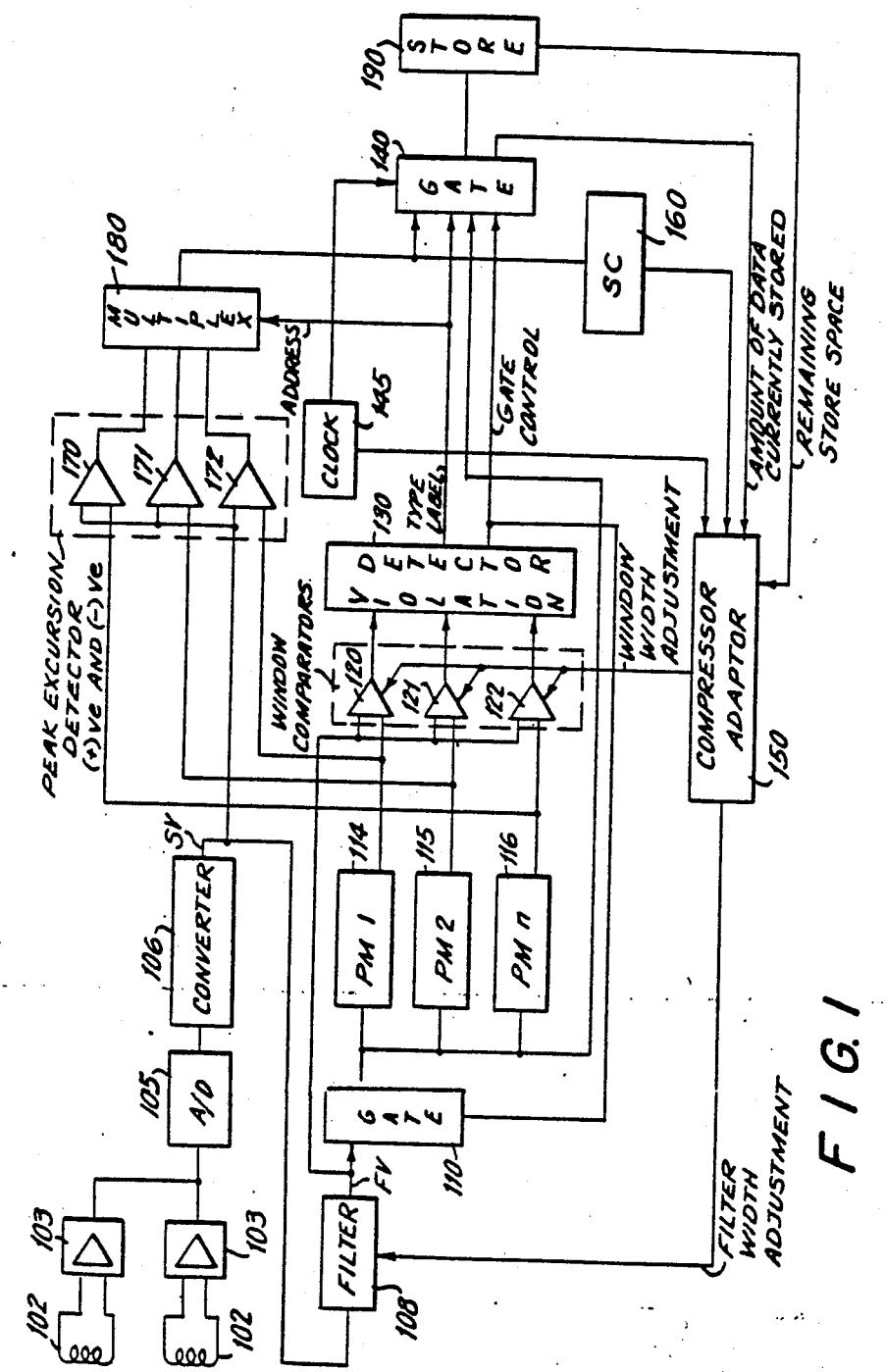
FIG. 1 is a block diagram of logic control for an adaptive data logger according to the invention.

FIG. 1 illustrates a logic scheme, in block form, for a preferred, but nonetheless illustrative, embodiment of an adaptive data logger according to the invention.

A plurality of sensors 102 provide the input signals which are to be stored or logged. While only two sensors 102 are shown, it will be understood that a data logger may be designated to accomodate any number of sensors, with size and cost, in general, being the primary design criteria. The sensors 102 may be any known type, including millivoltmeter, milliammeter, thermistor, thermocouple, event (contact closure), and various frequency or pulse counting sensors. There is no restriction on the type of sensor which may be used in conjunction with the data logger.

Amplifier/converters 103,106 may be selectively applied to the signals provided by each of the various sensors 102. Each converter 103 may be predefined so as to convert a signal from a specific type of sensor (Type K thermocouple, for example) into an appropriate range for further use (e.g., 0–2 volts). According to one aspect of the invention, the adaptive data logger may be provided with a library or set of converters corresponding to the most frequently used sensor types. Up to 100 or more different converters 106 may be provided in the internal library. This feature results in an extremely flexible device, since a customer having many different data logging requirements need only use one device. In the past, customers have had to specify the sensor to be used, so that the data logger purchased could be factory-equipped to handle only one or a few different types of sensor input signals. This burden is entirely removed by the present invention.

After signals from the sensors 102 are converted and amplified 103 so that they are within a predetermined working range, analog signals may be converted into digital form with the aid of a novel A/D converter 105 according to an aspect of the invention. This feature, if used, provides data resolution performance comparable to a 13–14 bit device, although only 8 bit devices are used. The new arrangement described below eliminates nonlinear effects present in the A/D transfer characteristic due to at least the three least significant bits of the 8 bit devices.

It will be understood that the conversion 106 required for particular sensor types may occur either before or after the A/D converter.

Figure 4:
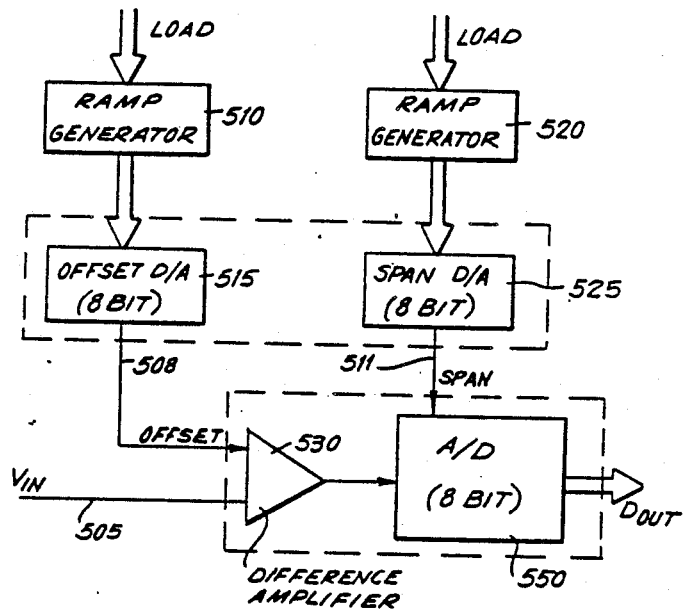
FIG. 4 is a block diagram illustrating novel aspects of the inventive analog-to-digital conversion process.

Referring briefly to FIG. 4, a unique arrangement for obtaining better than 8 bit performance from 8 bit devices is shown. It is known to apply an input analog voltage and an offset value to a difference amplifier, and then to apply the amplifier output to an A/D converter. Furthermore, a span value may also be applied to the A/D converter, in order to reduce the effective full scale, thus increasing data accuracy and resolution. The result of the conversion, however, includes the value of the offset, and thus, any errors in the offset are carried along directly into the digital output value.

According to the invention, the offset and span values are variably adjustable in a special manner so as to substantially eliminate the nonlinearity of the offset value. First, the approximate position of $V_{in}$ 505 is found, relative to the full span, by setting the offset 508 at zero and the span 511 at full scale. Next, the offset ramp generator 510 is loaded such that the offset 508 will ramp up from below $V_{in}$ 505 and will approach $V_{in}$. Similarly, the span ramp generator 520 is loades such that the span value 511 will ramp down to achieve progressively greater magnification. The output of the difference amplifier 530 and the span D/A 525 are then applied to an 8 bit A/D 550, yielding the digital output. This operation is repeated a number of times, e.g., eight times, with the span becoming progressively smaller and the offset approaching the input voltage. The output from this system, to be used as the sensed value in the data logger, may be an average of the individual results, providing an exceptionally high resolution output, considering the devices used.

Any non-linearity in the offset D/A converter 515, which would typically be specified as plus or minus 1/256 of full scale for an 8 bit device, will appear as an error on any one result. The use of a plurality of systematically related offset D/A settings reduces the effect of any one non-linearity dramatically, even to the extent of eliminating the non-linearities entirely if a set of results are obtained from one complete cycle of non-linearities.

In any event, the local effects of the non-linearities on any small section of the output transfer characteristic are very much reduced. By calibrating two points bordering a range which the user believes to be critical or useful, local gain and offset errors may be effectively removed. The ramping process has also been discovered to provide excellent differential linearity, in addition to high resolution and low output non-linearity.

The advantages of such an A/D converter are readily apparent when viewed in the context of the inventive data logger. In particular, it is no longer necessary for a customer to specially order the particular useful range of a data logger. This eliminates the need to purchase dedicated equipment. Furthermore, where the nonlinearity cycle is relatively short, virtually all nonlinearity offset errors may be removed. Finally, even in the face of long-term nonlinearity cycles, the unique two point calibration scheme provides excellent results at least within that predetermined section or range.

As merely a single example of the novel A/D converter structure, the D/A converters 515,525 may be provided by a single AD7528 device, manufactured by Analog Devices. The difference amplifier 530 and 8 bit A/D may be provided in a single ADC0803 device, a product of National Semiconductor Corp.

The digital output signal of the A/D converter 105 thus represents the actual sensed value at a particular moment in time. One purpose of the invention is to get any sensed value of interest from the A/D converter 105 into the storage or memory 190 of the data logger. The remaining logic elements shown in FIG. 1 serve to accomplish this task, in a preferred manner.

The sensed value may be applied to a variable band width filter 108 which may range from a narrow band or "hard" filtering state to a substantial pass-through or open condition, the filter state varying in a unique manner more clearly described below. Upon filtering, the data value may be referred to as the filtered value. As a corollary to the function of logging only data values of interest, substantially all data values which are not of interest are not stored or recorded. The filtered value is used in determining whether its corresponding sensed value is to be logged.

The filtered value may be controllably applied, through a gate 110, for example, to a plurality of parallel predictor mechanisms 114, 115, 116. Each predictor mechanism may use a number of the most recent filtered values passed by the gate 110, e.g., the last three, to predict the next occurring filtered value. The predictor mechanism may be nothing more than a simple mathematical extrapolator, extrapolating on any given signal behavior assumption. For example, one predictor mechanism may use only the last gated filtered value to predict the next, assuming that the new filtered value has not changed substantially. This pattern corresponds to a great majority of data logging applications, where nothing occurs for most of the recording period.

Another predictor mechanism may use the last two gated filtered values to predict the next, assuming that a steady-state increase or decrease is occurring. This corresponds to another substantial portion of observed data over time. Still another predictor mechanism may use the last three gated filtered values to predict the next data value, assuming an exponentially growing or decaying pattern. Such a pattern corresponds to the bulk of natural short-term phenomena. It will be understood that many other prediction mechanisms may be devised, corresponding to any expected signal pattern.

The predicted values for each of the different predictor mechanisms are applied to a corresponding set of window comparators 120, 121, 122 in order to determine whether or not the new filtered value represents a data value of interest. Each window comparator determines whether the actual filtered value is sufficiently close to the particular predicted value so as to be within an adjustable "window" around that predicted value. Window comparators 120, 121, 122 for each of the predictor mechanisms 114, 115, 116 make this determination in parallel. Comparator output signals YES or NO may be applied to a corresponding plurality of inputs of a violation detector 130, which may comprise gate control means.

In the case where a window comparator has determined that a filtered value is within the particular window around a corresponding predicted value, a signal reflecting "NO" violation is provided to the violation detector 130. Conversely, a filtered value outside the particular window will cause indication of a violatio ("YES"). According to an aspect of the invention, these signal inputs to the violation detector 130 are utilized as follows. So long as the "NO" condition is present at any one of the violation detector inputs, a gate 140 for controlling data entry into storage 190 may remain closed, the data value may be deemed to be of no interest, and it is not stored by virtue of operation of the violation detector.

A highly advantageous result is achieved, however, when the last of the window comparator failures occurs. Once a failure is detected by an individual window comparator, the corresponding "YES" input state for the violation detector 130 is maintained until all of the comparators indicate violations, at which time all inputs are reset to indicate no violations of the particular windows around the various predicted values. At substantially the moment that the last window comparator is caused to indicate a failure, the violation detector 130 may cause a gate 140 to open, allowing data storage to occur. This same gate control signal may be used to open gate 110, mentioned above, in order to include the most recently recorded filtered value in the group of data values upon which the predictions are calculated.

At the same time, the violation detector 130 provides, for logging, the identity of the last-failed window comparator, which corresponds to some predefined behavior model. This information is used, to recreate the time record for the periods of time when data valves (either filtered value or sensed value) are not being logged. In this unique fashion, enormous amounts of raw data may be logged while actually storing remarkably few data values. Of course, a clock 145 provides the time at which the gate 140 is opened, so that the proper time scale may be reproduced. In an extreme example, it may be possible that 100 days worth of data values cause only a single actual filtered value to be logged. Such a result is not preferred, however, and additional features of the invention will now be described which may be used to prevent such a situation from occurring.

The fact that too few data values are being logged may indicate, among other things, that the windows used by the window comparators 120, 121, 122 are too wide, and thus filtered values actually substantially failing to match the predicted values are not causing failure indications to the violation detector 130. This fact may also signify that the filtering 108 is too hard, or it may signify both of these conditions.

A unique compressor adaptor 150 is provided to adjust both the window width and the filter width, according to performance of other parts of the inventive data logger. In this particular illustrative embodiment, the compressor adaptor 150 controls the rate of data logging so that substantially all of the storage space is exhausted at the end of the preselected recording time period. This control is responsive at least in part, to the time provided by the clock 145, the amount of data space being used up in a given current gate opening event (gate 140), and the amount of storage capacity remaining in the storage medium 190. The compressor adaptor 150 may further be responsive to a symmetry calculator 160, whose operation will be described later.

Essentially, when storage capacity 190 is not being consumed fast enough so that it will be exhausted at the end of the recording period, the filter bandwidth may be enlarged, thus allowing greater deviation of the filtered value to occur. If such action does not increase the rate of logging new values, the windows around the various predicted values may be decreased. Both of these measures will tend to cause more violations to be detected. These corrective actions may occur simultaneously or, alternatively, either one may precede the other.

The cycling time of the compressor adaptor 150 may be kept deliberately relatively slow, as compared to the sampling frequency of data logger itself. This is to ensure that a transient value does not immediately cause the filter bandwidth to open or the window widths to be increased. Thus, several new data values may be logged before a trend is recognized, at which time the filter bandwidth and window widths may then be appropriately adjusted.

The symmetry calculator 160 mentioned above serves to provide a relative indication of how well the predictor mechanisms 114,115,116 are performing. In order to make this determination, peak excursion detectors 170,171,172 may be provided to sample the difference between a sensed value and a predicted value. If there is consistently little correspondence between the two, it may be an indication that the filtering is too hard, or, in other words, that the predictions are not based on filtered values approximating the sensed values. In this case, the filter bandwidth may be increased.

The peak excursion detectors 170,171,172 may serve yet another purpose according to other aspects of the invention. Since this embodiment of an adaptive data logger only intermittently stores gated filtered values, it may also be desirable to know the extent of variations of the sensed value during the period when no new values were stored. This may be accomplished by storing the maximum excursion (in either the positive or negative direction, or both) away from the relevant predicted value, over the interval in question, at the same time as a new filtered value is logged. As was the case before, knowing the identity of the last-failed window comparator, at the moment a new data value is logged, enables the correct maximum excursion values to be selected from among the possible choices, one each corresponding to a different predictor mechanism. A multiplexer 180 may be used to control which particular set of maximum excursion values is stored, the appropriate address or type label (for the particular predictor mechanism) being applied to the multiplexer 180 by the same violation detector output as is used to tag data values being stored via the gate 140. Thus, the reconstructed time record may contain envelopes whose widths represent the maximum peak excursions (both positive and negative) during the entire period since the last logged value.

As described above, a highly efficient and novel adaptive data logger according to the invention can provide advangtages of enormous proportions. In one embodiment of the invention, for example, having four inputs, using a 16 bit data word, and sampling data every 650 milliseconds over a one month recording period, the inventive data logger may record an amount of information which in prior art devices would occupy over fifty megabytes of magnetic storage space, and which would take up literally hundreds of feet of strip chart paper for the relevant periods to be plotted at any useful scale.

The invention has wide applicability in the areas of HVAC, process control trouble-shooting, electrical power monitoring, event or failure recording, and many other industrial and scientific applications.

Another aspect of the invention is the unique capability for quick display and analysis of the logged data. Once the data recording period is complete, the data logger may be connected, via a cable and through a standard RS-232C communication port, for example, to a host computer. At that point, the entire data record may be played back and reconstructed by the host computer, the signal processing provided in the computer comprising a substantial mirror image of the structure and function of the adaptive data logger. As was stated above, the time record may be reconstructed from the data values as long as the last-failed window comparator is known for each new data value.

Figure 2:
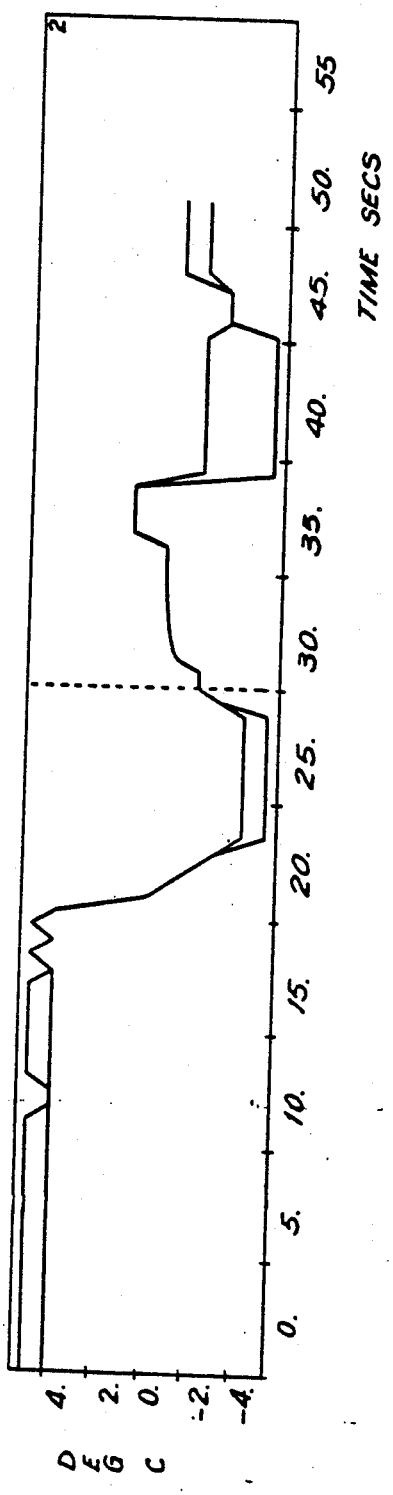
FIG. 2 is one example of a typical time record of data values stored by the adaptive data logger.

FIG. 2 is an illustrative example of a time record obtained with an embodiment of the inventive data logger. In regions of the plotted curve corresponding to time periods when at least one predictor mechanism was satisfied, but at the same time the sensed values fluctuated around the predicted values, the curve possesses "envelopes". These envelopes, e.g., between approximately 12 and 17 seconds, 23 and 28 seconds, and 39 and 45 seconds, define the maximum peak excursions encountered during the time period within the envelope. Other portions of the time record are seen to be defined by unique ordinate values, in this case temperature, in degrees Celcius. Such a portion, e.g., between 17 and 23 seconds, may be a plot of actually logged filtered values, or may represent several extrapolations of predicted values, the intermediate logged values corresponding precisely to the predicted values, no fluctuation about the predicted values having occurred.

A data logger according to the invention may provide the capability to virtually instantly plot maximum/minimum curves (e.g., to display noise levels), cumulative integrals, histograms, or other desired types of curves for quick data evaluation. The user may optionally provide custom programming for performing analysis according to any particular needs.

Another useful feature of the invention is the ability to "zoom in" on any particular portion of the displayed time record by, for example, defining a frame around the desired portion. The boundaries of the frame may then serve as the entire scale against which the relevant selected portion can be displayed. This is particularly important in the field of data logging, since the time and value scales over the long-term recording period may well be meaningless in the context of particular short-term events occurring during the course of that period.

Figure 3:
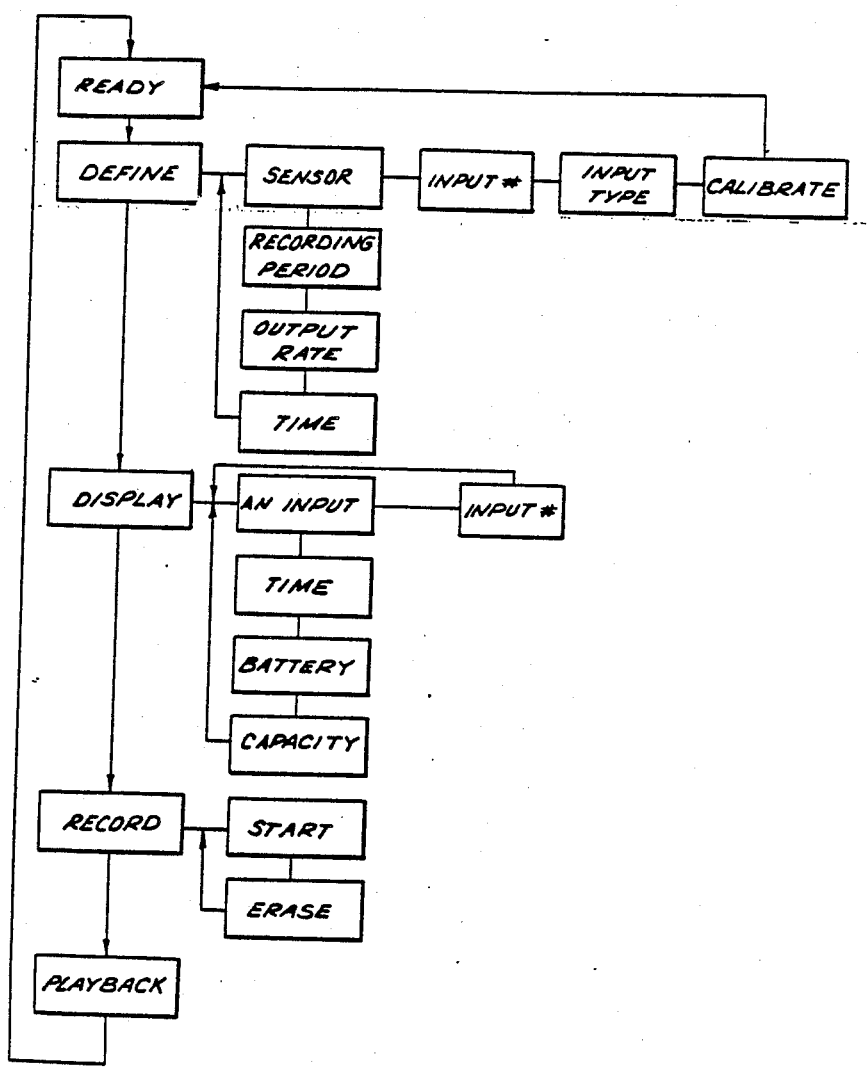
FIG. 3 is a flowchart illustrating one embodiment of operator control for an adaptive data logger according to the invention.

Referring now to FIG. 3, a flow chart demonstrating the versatility and ease of operation of the invention is provided. A display, e.g., liquid crystal display, may be provided for displaying various menu options. Any of the various menu selections may be made by using as few as two input means, e.g., switches, where the menu options are structured to progress in a continuously looping fashion. A first menu advancing means, which may be a pushbutton, microswitch, or the like, may be used to display the desired option, or a desired value of an option already selected, where different values are selectable. A second input means, e.g., another switch, may be provided in order to "accept" or "enter" the currently displayed option or value.

In an illustrative embodiment, the following functions may be provided. A "define" mode or option allows for selection of various sensor information, including a sensor type selected from a predefined library of sensor types, and sensor calibration, if desired. A recording period, the actual time, and an output (baud) rate for downloading data to a host computer may also be defined. In a "display" mode, data values for any of the plurality of inputs, the time, battery condition, and remaining storage capacity may be displayed. A "record" option may be provided for starting and stopping the data logging process, and for erasing the data currently stored which comprises the time record. A "playback" mode may enable the downloading of data to the host computer at the selected baud rate.

Any number of variations, modifications and substitutions may be made to the operating functions of the inventive data logger, as well as to the many other aspects of the invention, without departing from either the spirit or scope of the invention, the invention being limited only by the claims.

We claim:

1. A device for recording data signals over a period of time, comprising:
   means for receiving said data signals;
   determining means responsive to said received data signals for determining whether any one of said received data signals need be recorded in order to later represent a pattern of values of all of said received data signals over said time period, wherein said determining means further comprises:
   predictor means responsive to at least one stored data signal for predicting a next expected data signal value;
   storage means for storing data signals determined to be necessary for said later representation, said storage means having a predetermined storage capacity, said determining means being responsive at least to a first percentage of said storage capacity which contains stored data signals;
   comparing means for determining a difference between said next expected data value and said received data signal value;
   indicating means responsive to said comparing means for providing an indication that said difference exceeds a predetermined limit;
   adaptor means for adjusting said predetermined limit, said adaptor means responsive at least to said first percentage of said storage capacity which contains stored data signal values;
   controllable filter means for filtering received data values before said data values are stored, so that filtered values are used by said predictor means to predict said next expected data signal values, wherein said controllable filter means is responsive to said adaptor means; and
   peak detector means responsive to said next expected data signal values and said received data signal value, for providing a maximum difference value between said received data signal value and said next expected data signal values over a period of time extending back until a time at which said last filtered data signal value was stored, said adaptor means being additionally responsive to said maximum difference value provided by said peak detector means.

2. A device for recording data signals over a period of time, comprising:
   means for receiving said data signals;
   determining means responsive to said received data signals for determining whether any one of said received data signals need be recorded in order to later represent a pattern of values of all of said received data signals over said time period;
   storage means for storing data signals determined to be necessary for said later representation, said storage means having a predetermined storage capacity, said determining means being responsive at least to a first percentage of said storage capacity which contains stored data signals, wherein said determining means further comprises:
   predictor means responsive to at least one stored data signal for predicting a next expected data signal value;
   a plurality of said predictor means for predicting a corresponding plurality of next expected data signal values, each of said plurality of said predictor means being responsive to at least one stored data signal for predicting each respective one of said corresponding plurality of next expected data signal values;
   a plurality of comparing means, each for determining a difference between each of said next expected data values and said received data signal value;
   a plurality of indicating means each correspondingly responsive to one of said plurality of comparing means for providing an indication that said difference exceeds a predetermined limit;
   controllable filter means for filtering received data values before said data values are stored, so that filtered values are used by said predictor means to predict said next expected data signal values, said comparing means making said difference comparison between received data signal values after filtering by said filter means, and said next expected data signal values; and
   peak detector means responsive to said next expected data signal values and said unfiltered received data signal value, for providing a maximum difference value between said unfiltered received data signal values and said next expected data signal values over a period of time extending back until the time at which said last filtered data signal value was stored.

3. The device of claim 2, further comprising:
   adaptor means for adjusting said predetermined limit and said controllable filter means, said adaptor means responsive at least to the percentage of said storage capacity which contains stored data signal values, and also to said maximum difference values provided by said peak detector means, so that substantially all of said storage means contains recorded data values at an end of said recording period.

4. A device for recording data signals over a period of time, comprising:
   means for receiving said data signals;
   determining means responsive to said received data signals for determining whether any one of said received data signals need be recorded in order to later represent a pattern of values of all of said received data signals over said time period;
   storage means, responsive to at least said means for receiving data signals and said determining means, for storing data signals determined by said determining means to be necessary for said later representation; and converter means, responsive to said means for receiving data signals, for converting analog received data signals into digital data signal values, said converter means including:

means for applying a difference between a received analog data signal and an offset value to an analog to digital converter;

means for applying a span value to said analog to digital converter;

means for storing a first digital output value provided by said analog to digital converter;

means for increasing said offset value by a predetermined amount;

means for decreasing said span value by a predetermined amount, said increased offset value and said decreased span value again being applied to said analog to digital converter so as to produce a second digital output value.

5. The device of claim 4, wherein a plurality of digital output values are provided by repeatedly increasing the offset value and decreasing the span value, at least two of the plurality of digital output values being averaged so as to produce a final result.

6. A method of converting an analog signal to a digital signal with high precision and resolution, comprising the steps:

applying a difference between a received analog data signal and an offse value to an analog to digital converter;

applying a span value to said analog to digital converter;

storing a first digital output value provided by said analog to digital converter;

increasing said offset value by a predetermined amount;

decreasing said span value by a predetermined amount, said increased offset value and said decreased span value again being applied to said analog to digital converter so as to produce a second digital output value.

7. The method of claim 6, further comprising:

producing a plurality of digital output values by repeatedly increasing the offset value and decreasing the span value, and then reapplying these values to the analog to digital converter, said digital signal being the average of the plurality of digital output values.

* * * * *